(12) United States Patent
Bateman et al.

(10) Patent No.: US 7,706,758 B2
(45) Date of Patent: Apr. 27, 2010

(54) CONTROLLING POWER SUPPLY BETWEEN A VOLTAGE GENERATOR, A LOAD AND A RECHARGEABLE BATTERY

(75) Inventors: David Bateman, Boulogne-Billancourt (FR); Sebastian Simoens, Soeaux (FR); Marc De Courville, Paris (FR)

(73) Assignee: Freescale Semiconductor, Inc., Austin, TX (US)

( * ) Notice: Subject to any disclaimer, the term of this patent is extended or adjusted under 35 U.S.C. 154(b) by 154 days.

(21) Appl. No.: 10/497,426

(22) PCT Filed: Nov. 21, 2002

(86) PCT No.: PCT/EP02/13060

§ 371 (c)(1),
(2), (4) Date: Dec. 16, 2004

(87) PCT Pub. No.: WO03/047195

PCT Pub. Date: Jun. 5, 2003

(65) Prior Publication Data

US 2005/0105656 A1    May 19, 2005

(30) Foreign Application Priority Data

Nov. 30, 2001    (EP) ................................ 01403082

(51) Int. Cl.
H04B 1/04    (2006.01)
(52) U.S. Cl. .................. 455/114.3; 455/127.5; 455/522
(58) Field of Classification Search ............... 455/114.3, 455/127.5, 52.2
See application file for complete search history.

(56) References Cited

U.S. PATENT DOCUMENTS

| 5,732,333 | A |   | 3/1998 | Cox |
| 5,764,706 | A | * | 6/1998 | Carlin et al. ................. 375/326 |
| 5,796,784 | A | * | 8/1998 | LoGalbo et al. ............. 375/298 |
| 5,878,089 | A | * | 3/1999 | Dapper et al. ................ 375/325 |
| 5,949,796 | A | * | 9/1999 | Kumar ........................ 370/529 |
| 6,091,932 | A | * | 7/2000 | Langlais ...................... 725/111 |
| 6,621,345 | B2 | * | 9/2003 | Matsugatani et al. ........ 330/281 |
| 6,657,492 | B1 | * | 12/2003 | Perthold et al. ............. 330/149 |
| 6,920,362 | B2 | * | 7/2005 | Matsumoto .................. 700/45 |

(Continued)

FOREIGN PATENT DOCUMENTS

JP    09321676 A    12/1997

OTHER PUBLICATIONS

"Communication Through Band-Limited Linear Filter Channels," XP002212154, Nov. 28, 2000, McGraw Hill, NY, pp. 598-660.

(Continued)

*Primary Examiner*—Nay A Maung
*Assistant Examiner*—Tuan H Nguyen

(57) ABSTRACT

In an orthogonal frequency division multiplex communication system, for example a HIPERLAN/2 system, power amplifiers (224) of mobile terminals (4, 6) are switched off when not in use, and then switched on again when a signal transmission is to be made. This conserves power, but introduces a power amplifier transient (315). An access point (2), i.e. a type of base station, compensates for these power amplifier transients (315) using a simple scalar constant gain transient correction, over a full OFDM symbol (or a plurality of OFDM symbols). The correction is updated on an OFDM symbol by symbol basis (or plurality of symbols by plurality of symbols basis).

14 Claims, 8 Drawing Sheets

U.S. PATENT DOCUMENTS

| | | | |
|---|---|---|---|
| 6,975,694 B1* | 12/2005 | Betts | 375/360 |
| 6,989,733 B2* | 1/2006 | Simonsen et al. | 375/259 |
| 7,307,569 B2* | 12/2007 | Vrazel et al. | 341/144 |
| 2002/0159532 A1* | 10/2002 | Wight | 375/260 |
| 2002/0164968 A1* | 11/2002 | Crawford | 455/277.1 |
| 2003/0072397 A1* | 4/2003 | Kim et al. | 375/347 |
| 2004/0095895 A1* | 5/2004 | Barnes | 370/252 |

OTHER PUBLICATIONS

Bateman et al., "Power-Amplifier Transient Tracking in OFDM," IEEE, 2002, XP002212268, pp. 803-806.

* cited by examiner

CONTROLLING POWER SUPPLY BETWEEN A VOLTAGE GENERATOR, A LOAD AND A RECHARGEABLE BATTERY

FIELD OF THE INVENTION

This invention relates to Orthogonal Frequency Division Multiplexing (OFDM) communication systems. This invention is applicable to, but not limited to, HIPERLAN/2 communication systems.

BACKGROUND OF THE INVENTION

In the field of wireless communication systems, it is known generally that power may be conserved by switching off components when they are not in use. Power conservation is known to be particularly desirable in battery powered apparatus.

One power hungry component is the power amplifier in a transmitter. However, if switched off to conserve power, when switched on again the power amplifier is unstable for a time, thus producing a power transient.

Compensation (or tracking) schemes are known for accommodating such a power transient. Such compensation schemes may be implemented in the transmitter or in a receiver.

For single-carrier systems such power amplifier transient tracking in the receiver in effect forms part of the automatic gain control of the system. One example of this is disclosed in G. Travares and M. S. Piedade, "High performance algorithms for digital signal processing AGC", IEEE International Symposium on Circuits and Systems, vol 2, p 1529-1532, 1990.

However, in multi-carrier systems, e.g. OFDM systems such as HIPERLAN/2 (as specified by the ETSI normalisation committee, broadband Radio Access networks (BRAN), HIPERLAN Type 2), the large peak-to-average ratio of the received signal precludes the use of the automatic gain control to compensate for a power amplifier transient, and thus automatic gain control must be performed only in the preamble of the frame, for example as disclosed by WO-0079748.

For this reason many transmit-side compensation schemes have been proposed, for example as disclosed by U.S. Pat. No. 527,415. However, these schemes are complex to implement.

Certain other tracking schemes, for example as disclosed by M. Sandell and O. Edfors, "A comparitive study of pilot-based channel estimators for wireless OFDM", Research Report TULEA 1996, Lulea University of Technology, track pilots in multi-carrier systems, but this is for the purpose of correcting for time-varying channels. Moreover, such schemes rely on additional pilots that are not present in many OFDM systems, including HIPERLAN/2.

XP-002212283 discloses a multi-carrier radio communication unit, where large fluctuations in transient interference due noise is prevented in a variable gain amplifier. Switching an AGC circuit into the signal path, or using a control voltage when a low-level signal is received prevents the transient interference. A need therefore exists for a method of compensating a power amplifier transient in OFDM systems, wherein the above mentioned disadvantages may be alleviated.

STATEMENT OF INVENTION

In a first aspect the present invention provides a method of compensating a gain transient of a received orthogonal frequency division multiplex, OFDM, signal, as claimed in claim 1.

In a further aspect the present invention provides an orthogonal frequency division multiplex, OFDM, communication method, as claimed in claim 8.

In a further aspect the present invention provides a storage medium storing processor-implementable instructions, as claimed in claim 11.

In a further aspect the present invention provides a communication unit, as claimed in claim 12.

In a further aspect the present invention provides a communication system, as claimed in claim 14.

Further aspects are as claimed in the dependent claims.

BRIEF DESCRIPTION OF THE DRAWINGS

Embodiments of the present invention will now be described, by way of example only, with reference to the accompanying drawings, in which.

DESCRIPTION OF PREFERRED EMBODIMENTS

In the first embodiment, the invention is applied to a local area network (LAN) communication system compliant with HIPERLAN/2, but it is to be appreciated the invention can be applied to any multi-carrier OFDM communication system.

Figure 1:
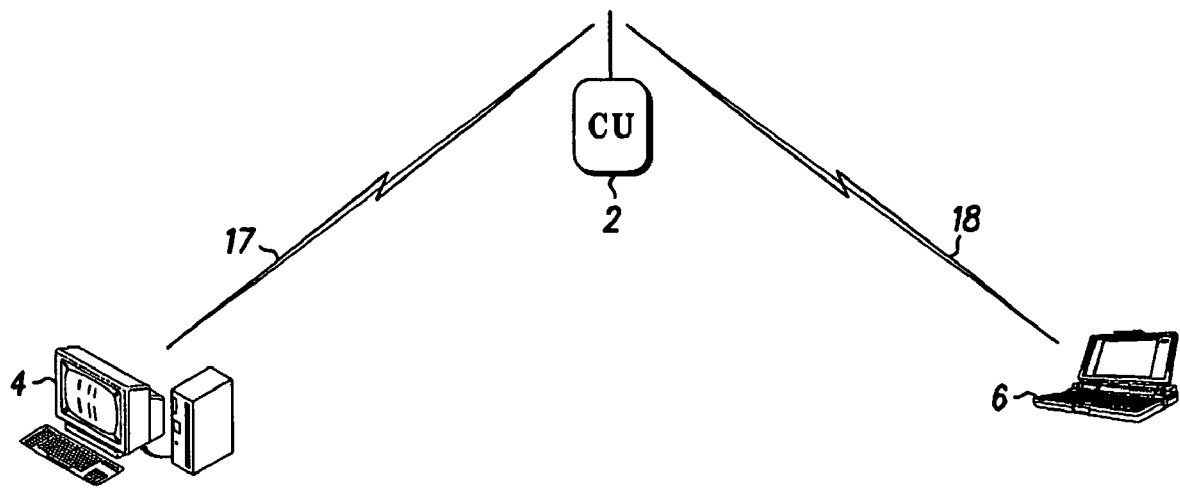
FIG. 1 is a schematic illustration of part of a HIPERLAN/2 communication system.

FIG. 1 shows part of a HIPERLAN/2 communication system 1. A plurality of mobile terminals 4, 6 communicate over radio links 17, 18 with a base station, referred to under HIPERLAN/2 terminology as an access point 2. In this example the mobile terminal 4 is a desktop personal computer, and the mobile terminal 6 is a portable personal computer. In general, the mobile terminals may be any type of data terminal (or possibly even speech apparatus). The system comprises many other mobile terminals and access points, which for clarity are not shown.

The access point 2 and the mobile terminals 4, 6 each contain one or more transceiver units (typically the mobile terminals contain only one, and the access point contains plural).

In this embodiment, the access point 2 and the mobile terminals 4, 6 have been adapted, to offer, and provide for, reduced power consumption in the mobile terminals 4, 6 by switching off of power amplifiers, and compensation by the access point 2 of the resulting power amplifier transient in signals received from the mobile terminals, as will be described in more detail below. In other embodiments the invention may be applied by adapting just some of the mobile terminals with respect to turning off the power amplifier. In yet further embodiments, the invention may be applied alternatively or additionally to the case where the access point switches off its power amplifier and the compensation is done in one or more of the mobile terminals.

More generally, the adaptation may be implemented in the respective communication units (i.e. access point 2 and/or mobile terminals 4, 6) in any suitable manner. For example, new apparatus may be added to a conventional communication unit, or alternatively existing parts of a conventional communication unit may be adapted, for example by reprogramming of a one or more processors therein. As such the required adaptation may be implemented in the form of processor-implementable instructions stored on a storage medium, such as a floppy disk, hard disk, PROM, RAM, FPGA, ASIC, DSP or any combination of these or other storage media.

It is also within the contemplation of the invention that such adaptation of transmission characteristics and/or receiver operation may alternatively be controlled, implemented in full or implemented in part by adapting any other suitable component or part (not shown) of the communication system 1. Further, in the case of other system infrastructures, implementation may be at any appropriate node such as any other appropriate type of base station etc. Alternatively the various steps involved in determining and carrying out such adaptation (as will be described in more detail below) can be carried out by various components distributed at different locations or entities within any suitable network or system.

Figure 2:
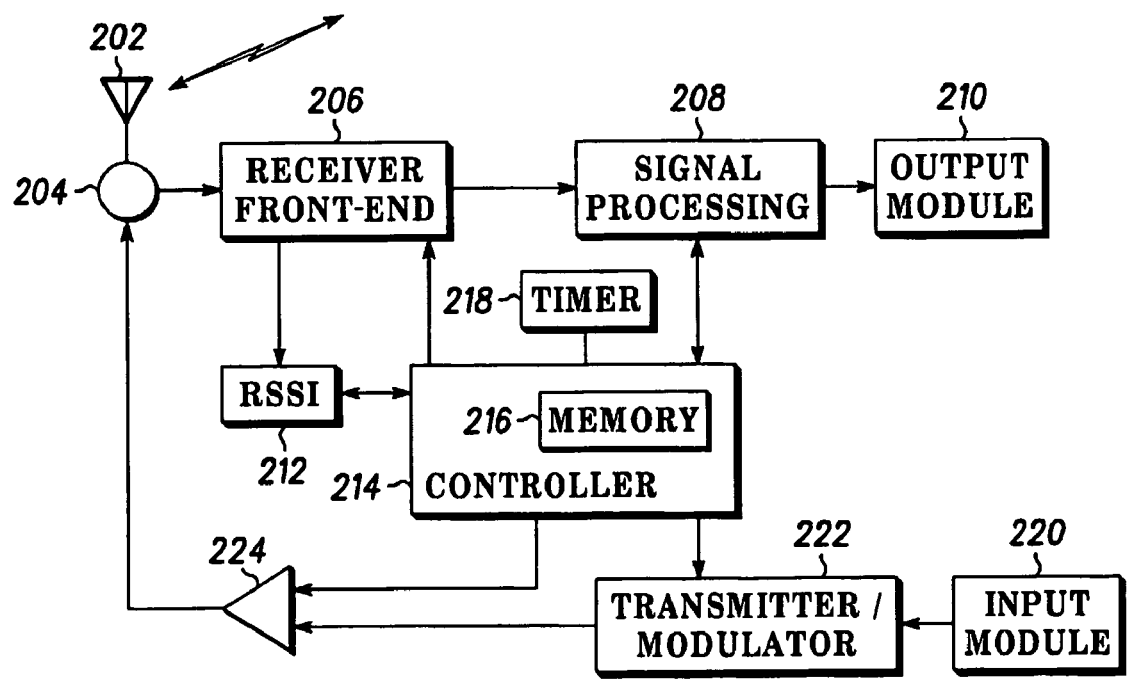
FIG. 2 is a schematic illustration of a communication unit.

As mentioned above, in this embodiment the mobile terminals 4, 6 are adapted with respect to transmission and the access point 2 is adapted with respect to reception. Also, in this embodiment the access point 2 and the mobile terminals 4, 6 are of the same basic form with respect to aspects relevant to understanding this embodiment, and thus each constitute a basic communication unit 110 as illustrated in block diagram form in FIG. 2, and which will now be referred to in the further description of this embodiment. In each case, only components relevant or helpful to understanding the invention in terms of wireless communication are shown and described, other aspects such as the core data terminal functions of the mobile terminals 4, 6 are not included.

Each communication unit 110 contains an antenna 202 coupled to a switch 204 that provides isolation between receive and transmit chains within the communication unit 110.

The receiver chain, as known in the art, includes scanning receiver front-end circuitry 206 (effectively providing reception, filtering and intermediate or base-band frequency conversion). The scanning front-end circuit is serially coupled to a signal processing function 208.

An output from the signal processing function is provided to an output module 210.

The receiver chain also includes received signal strength indicator (RSSI) circuitry 212, which in turn is coupled to a controller 214 that operates to maintain overall control of the different functions and modules of the communication unit 110. The controller 214 is also coupled to the scanning receiver front-end circuitry 206 and the signal processing function 208 (generally realised by a digital signal processor, i.e. DSP).

The controller 214 includes a memory 216 that stores operating regimes, including those of interest with respect to this invention such as turning the power amplifier (see below) on and off (when transmitting) and compensating for power amplifier transient (when receiving). A timer 218 is typically coupled to the controller 214 to control the timing of operations (transmission or reception of time-dependent signals) within the communication unit 110.

As regards the transmit chain, this includes an input module 220. The input module is coupled in series through transmitter/modulation circuitry 222 and a power amplifier 224 to the antenna 202. The transmitter/modulation circuitry 222 and the power amplifier 224 are operationally responsive to the controller.

The various components within each communication unit 110 are realised in this embodiment in integrated component form. Of course, in other embodiments, they may be realised in discrete form, or a mixture of integrated components and discrete components, or indeed any other suitable form. Further, in this embodiment the controller 214 including memory 216 is implemented as a programmable processor, but in other embodiments can comprise dedicated circuitry or any other suitable form.

It is noted that corresponding features to those described above with respect to communication unit 110 are also found in conventional communication units (i.e. i.e. conventional HIPERLAN/2 mobile terminals and access points). However, in this embodiment the respective communication units 110, namely the access point 2 and the mobile terminals 4, 6, differ over conventional communication units by virtue that the controller 214, including memory 216, and where appropriate other described components, are adapted with respect to transmission and/or reception as will be described in more detail below.

In overview, in this embodiment the respective power amplifiers 224 of the mobile terminals 4, 6 are switched off when not in use, and then switched on again when a signal transmission is to be made. This conserves power, but introduces a power amplifier transient. The access point 2 compensates for these power amplifier transients using a simple scalar constant gain transient correction, over a full OFDM symbol (or a plurality of OFDM symbols). The correction is updated on an OFDM symbol by symbol basis (or plurality of symbols by plurality of symbols basis). Before explaining these aspects more fully, it is most convenient to:

(i) explain some details about power amplifier transients, particularly in the context of a HIPERLAN/2 system; and (ii) explain a further aspect, namely that in systems such as HIPERLAN/2 a particularly advantageous implementation of the invention is to introduce a level of power amplifier transient that may still be accommodated by receivers within the limits of the system specification, to some acceptable or allowable degree of performance, even if the compensation method is not used in the receiver.

Points (i) and (ii) are now dealt with as follows.

In a preferred implementation, the complete system should adhere to the HIPERLAN/2 specifications. For example, it will be advantageous if a power amplifier transient meets the transmit specifications of the standard, while maintaining acceptable, if degraded, performance with systems that do not use this invention. Hence understanding of the effect of the power transient on the transmitted and received signals, and the error rates is helpful.

Figure 3:
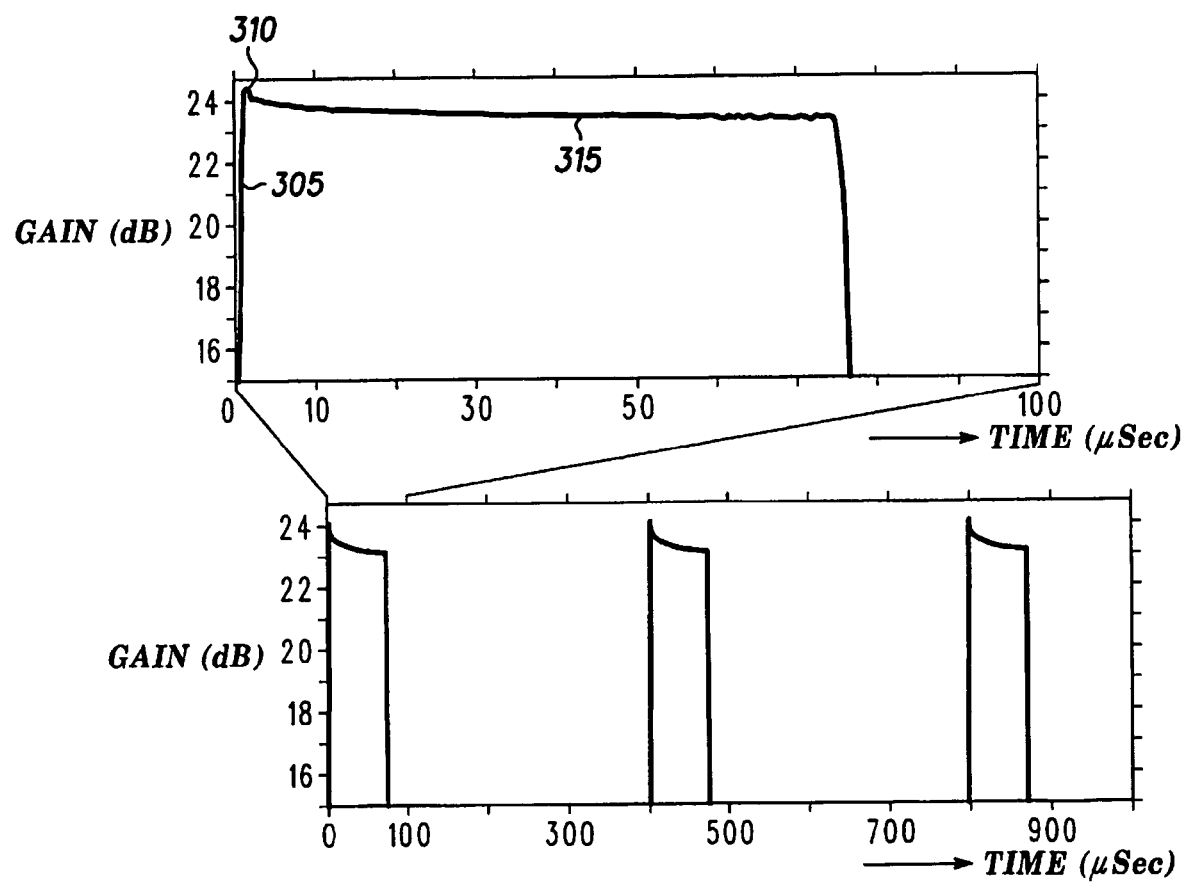
FIG. 3 shows a measurement of a typical power amplifier (ARAFTEK 7501) that may be used in a HIPERLAN/2 system, under transient conditions.

A measurement of a typical power amplifier (ARAFTEK 7501), that may be used in a HIPERLAN/2 system, under transient conditions is shown in FIG. 3. Even with systems using other power amplifiers, this gives an indication of possible performance.

Three effects can be seen in FIG. 3. A rapid rise 305 in the gain of the amplifier as the current reaches the amplifier, a ring in the gain causing a short-term spike 310 and finally a gradual degradation 315 in the gain as the amplifier heats up. It is not necessary to consider all of these effects, since the HIPERLAN/2 standard (in particular ETSI normalization committee, Broadband Radio Access Networks (BRAN), HIPERLAN type 2; Conformance testing specification; Part 1: Radio conformance testing requirements, Norme ETSI, document DEN/BRAN-020002-1, European Telecommunication Standards Institute, Sophia-Antipolis, Valbonne, France, December 1999) allows a 6 µsec switching time between receive and transmit modes. Therefore, if the power amplifier is turned on at the start of the switching time, only the slow degradation in the amplifier gain will be left by the time we come to transmit. It should be noted, that other amplifiers may have different transient response and in that case the other effects might be relevant. However, as will become evident below, the compensation scheme is independent of the form of the transient, and hence may also be applied to other transients.

After 6 µsec from the amplifier being switched on, the gain of the amplifier is 23.8 dB. This falls to a level of 23.1 dB over time, where the gain stabilises. We can model this gain transient by the simple formula $$\text{gain} = 20 \log_{10} V_g (1 + ae^{-kt}) \quad [1]$$

where $20 \log_{10} V_g$ dB is 23.1 dB, the stable gain of the amplifier. As noted above, when the amplifier is ready to transmit (assume t=0), the gain is 23.8 dB. Thus we can derive that a=0.08393. Similarly, after 100 µsec, the gain has dropped to 23.45 dB, and thus k=7135.

We now consider the effects of the gain transient. A simplistic, but useful way of considering the gain transient, is as a noise source. It is useful to consider this in terms of constellation points, a standard representation in the art, well known to the skilled person, in which quality of transmission is indicated by the spread of dots in constellation points, and where with ideal transmission there would just be perfect points rather than as in practice distributions around points. Here, let us assume that the positions of the constellation points are fixed for the modulation at the beginning of the frame, and remain unchanged during the frame. Thus, by the end of a long frame the constellation points have moved by 0.7 dB from their nominal values. We can therefore derive a signal-to-noise ratio (SNR) due to this effect as $$\text{SNR} = -20 \log_{10} a \quad [2]$$

Hence, for the case of the ARAFTEK amplifier the SNR due to the gain transient is calculated to be 21.5 dB.

It should be noted that the automatic gain control (AGC) is performed slightly after the transmission has commenced. Also the gain transient does not add a Gaussian distribution of constellation points like a thermal noise. Hence this number may be considered only as a worse case limit on the effect of the gain transient.

The gain transient effectively moves the constellation points closer to the decision levels. Hence the effect on the receiver sensitivity cannot be considered directly as a SNR, but rather an increase in the actual SNR that will be required to achieve a desired packet error rate (PER). The effect of the gain transient on the PER is therefore expected to be an offset in the PER curves.

As the error vector magnitude (EVM) is specified, relative to fixed constellation points, the gain transient may be directly considered as a noise in this case. The HIPERLAN/2 standard (in particular ETSI normalization committee, Broadband Radio Access Networks (BRAN), HIPERLAN type 2; Physical (PHY) layer, Norme ETSI, document DTS0023003, European Telecommunication Standards Institute, Sophia-Antipolis, Valbonne, France, December 1999) requires a minimum EVM specification of 24 dB for 64 QAM, and so we shall now consider the effect of this transient in more detail.

It should be noted that this simple model of the gain transient cannot take into account the effect of the inter-symbol modulation caused by the non-linear gain transient. This, combined with the effects of the channel, can cause a disturbance of the received signal, as the cyclic nature of the OFDM coding is broken. If we can consider that the OFDM sub-carriers are not correlated, then this inter-modulation can be considered as a thermal noise like effect. Thus the inter-modulation effect of the gain transient will add an error floor to the packet error rate (PER) curves. Additionally, the reduced receiver sensitivity with a gain transient will have the effect of exaggerating the existing error floor.

A more complete study of each of these effects is considered below.

We shall first consider the effect on the EVM. This is an important criterion in measuring the performance of a transmission system in isolation from the receiver. For this reason the ETSI HIPERLAN/2 standard specifies the maximum acceptable EVM for a compliant system to be 24 dB, as mentioned above. Thus, even though performing receiver-side power amplifier compensation, as will be described in more detail below, it is desirable that the transmitter is conformant even in the presence of the transient.

A proper analysis of the effects of the power amplifier transient on a HIPERLAN/2 system requires a full statistical analysis of randomly generated data, run for example with a HIPERLAN/2 simulator. Since the effect considered is primarily due to a RF imperfection, modelling of the RF components is a primary part of this. The present inventors have performed a study using a model of a HIPERLAN/2 prototype system with a gain transient as given in equation 1. The effect of the power amplifier gain transient can thus be directly obtained.

It should be noted that there is no method specified or known for measuring the EVM in the ETSI conformance testing. A different conformance testing document known for the EVM is for an IEEE standard, namely IEEE 802.11a High Speed Physical Layer in the 5 GHz band, draft supplement to standard 802.11, IEEE, New York, January 1999, where it is stated that the transmitted frames must have at least 16 OFDM symbols and that the EVM will be calculated as the root-mean squared of 20 transmitted frames. As 16 OFDM symbols represents a frame length of 64 μsec, the full effect of the gain transient will not be seen in this case. Hence the EVM will be significantly better than if the EVM were measured with frames with a large number of OFDM symbols.

TABLE 1

| Transmitted Signal | Error Vector Magnitude |
|---|---|
| 16 OFDM symbols No Transient | 30.5 dB |
| 128 OFDM symbols No Transient | 30.0 dB |
| 16 OFDM symbols With Transient | 29.1 dB |
| 128 OFDM symbols With Transient | 24.2 dB |

Taking these effects into account we find that the calculated EVM can be as summarised in Table 1, which shows the EVM for a 64 QAM signal transmitted at 10 dBm. It should be noted that the transmission power was selected to ensure that power amplifier linearity and the noise for small transmission signal did not effect the EVM performance. As can be seen in Table 1, when transmitting only 16 OFDM symbols the EVM is always significantly better. For the case where there is no gain transient, this improvement might just be due to the fact that 16 symbols is insufficient to have reasonable noise statistics. Thus, the results without gain transient can be considered to be the same within their confidence level.

However, it can be clearly seen that the degradation in the EVM due to the gain transient is clearly better when only 16 symbols are considered. If we consider 128 OFDM symbols when measuring the EVM, the EVM is degraded to such an extent that the ETSI specified limit of 24 dB is only just respected. As we have no specification for the ETSI EVM conformance test, it is thus unclear what the EVM is with a gain transient. However, in the worst case a gain transient of the form measured above is acceptable under the standard, albeit narrowly so.

Figure 4:
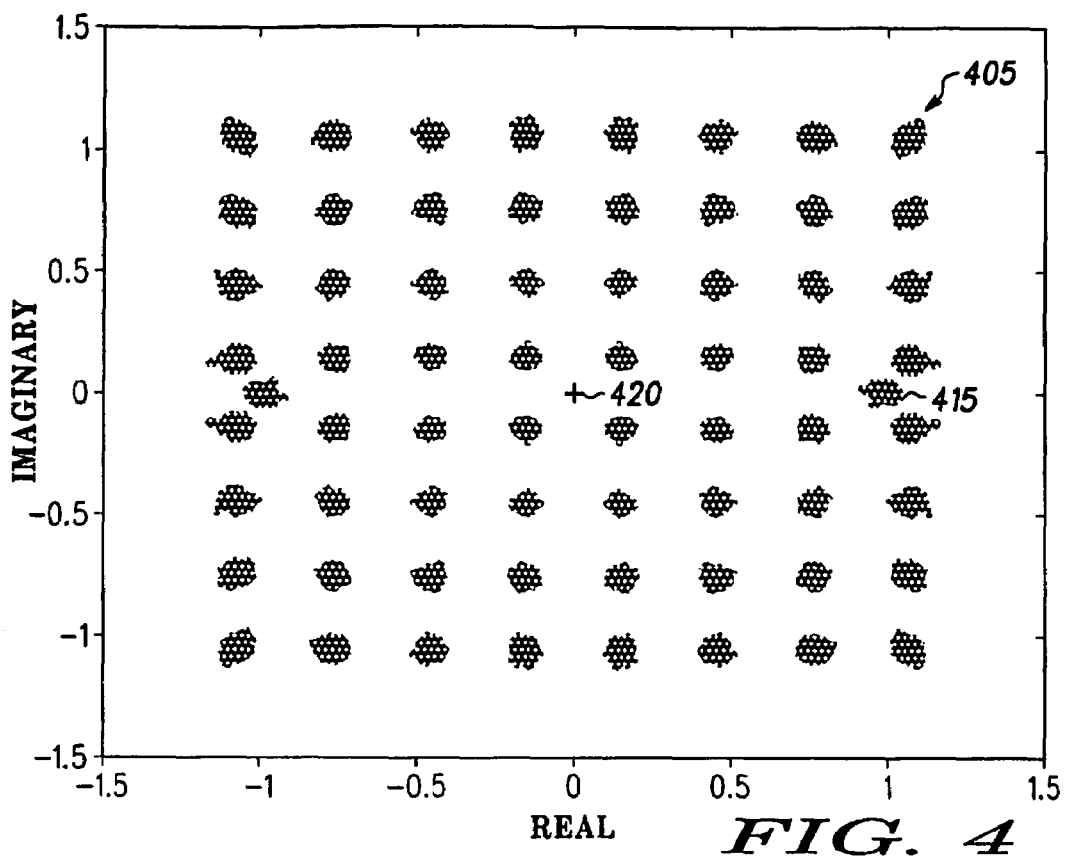
FIG. 4 shows transmitted constellations without a gain transient.
Figure 5:
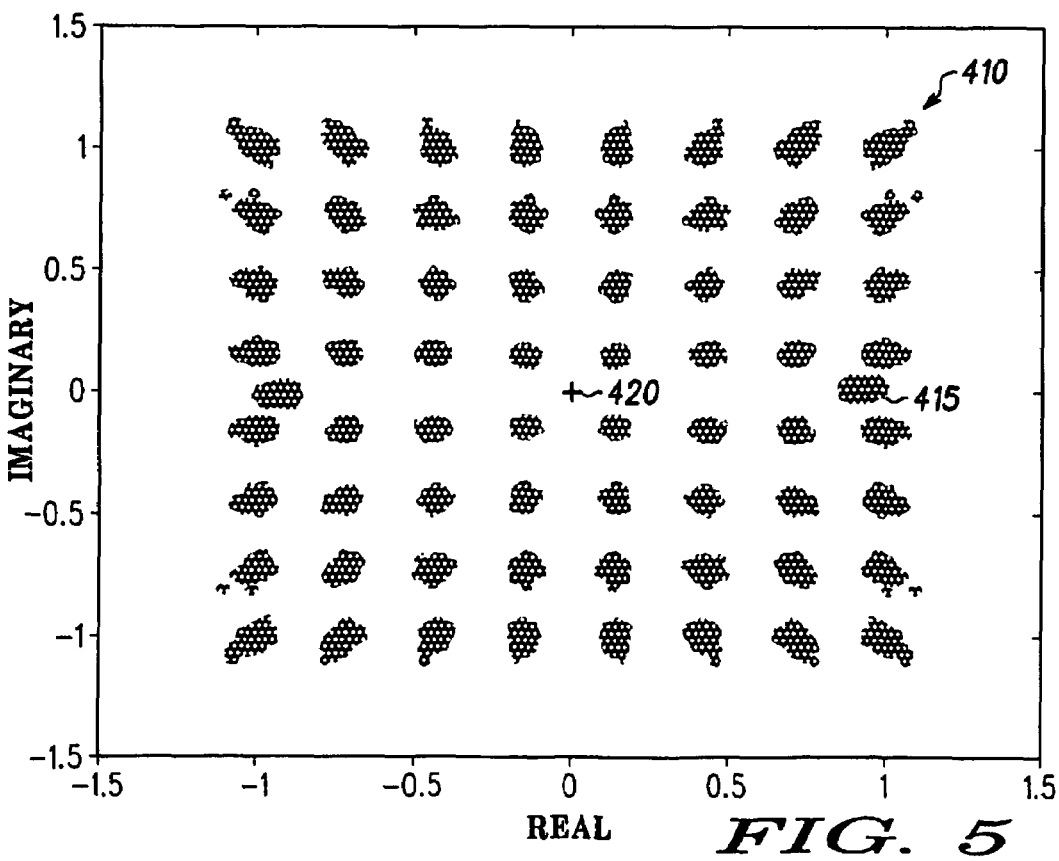
FIG. 5 shows transmitted constellations with a gain transient.

It is interesting to also consider the transmitted constellations. FIG. 4 shows the transmitted constellations 405 without a gain transient and FIG. 5 shows the transmitted constellations 410 with a gain transient. Also seen in both FIGS. 4 and 5 are the binary phase shift keying (BPSK) pilots 415 and the DC 420. Comparison of the transmitted constellation points 410 of FIG. 5 with the transmitted constellation points 405 of FIG. 4 shows that the constellation evolves in time due to the gain transient.

Figure 6:
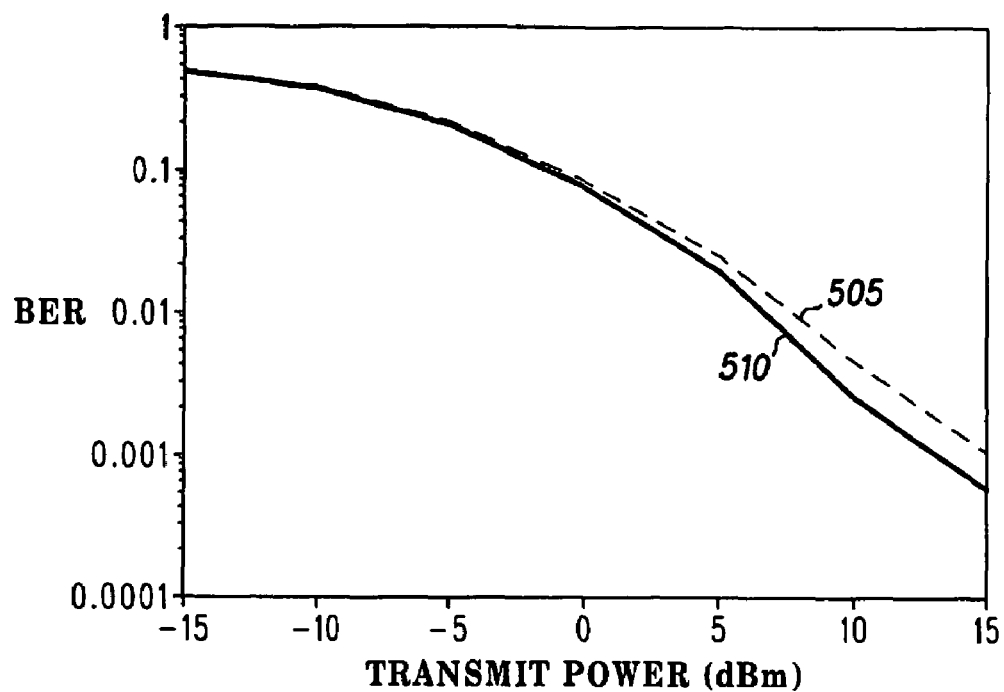
FIG. 6 shows a bit error rate (BER) with and without a transient.
Figure 7:
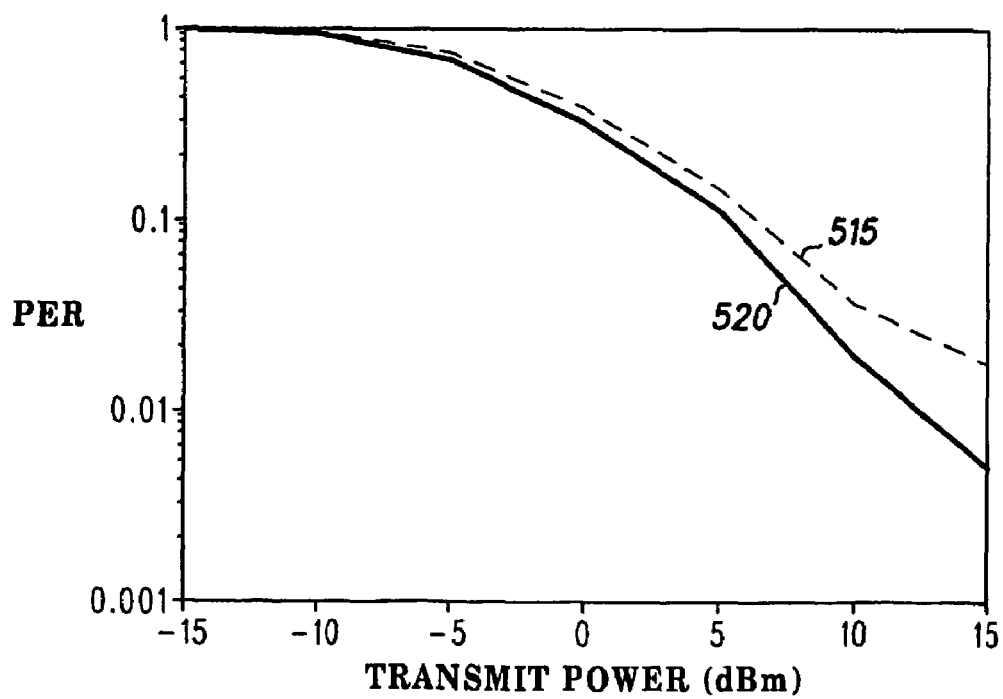
FIG. 7 shows a packet error rate (PER) with and without a transient.

We now consider the effect on the Bit Error Rate (BER) and the Packet Error Rate (PER). The same code as used to model the RF front-end for the EVM calculation can equally be used to model the effect on the bit and packet error rates. In this, case the channel plays an important role in determining the degradation due to the power amplifier transient. It is appropriate to model a 64 QAM signal on a BRAN A channel (as described in ETSI normalization committee, channel models for HIPERLAN/2 in different indoor scenarios, Norme ETSI, document 3ERI085B, European Telecommunication Standards Institute, Sophia-Antipolis, Valbonne, France, December 1999) with an ITU-P1238 propagation model (as described in ITU Radiocommunication Assembly, "Propagation data and prediction models for the planning of indoor radiocommunication systems and radio local area networks in the frequency range 900 MHz to 100 GHz", Technical report, ITU-R, 1997, ITU-R P.1238), and a distance of 5 meters between the transmitter and the receiver. As for the EVM results, 128 OFDM symbols were used in each frame. FIG. 6 shows the bit error rate (BER) with transient 505 and without transient 510. FIG. 7 shows the packet error rate (PER) with transient 515 and without transient 520.

An offset in the curves due to the gain transient can be seen in both FIG. 6 and FIG. 7. For instance, the gain transient causes 1 dB degradation in the required SNR to achieve a PER of $10^{-1}$. The more severe effect however is the introduction of an error floor in the results with a transient. Due to this error floor an additional 4 dB is required to achieve a $2 \times 10^{-2}$ PER.

It should be noted that although a significant degradation in the system is observed due to the power amplifier transient, the performance is still adequate for inter-operability requirements with systems that do not use the compensation process to be described in more detail below.

We shall now consider further theoretical analysis that justifies certain approximations made in the above analysis and which shows the compensation method to be described below to be particularly powerful despite being relatively simple.

The gain transient of the power amplifier is in fact a non-linearity. This will have the effect of inter-modulating the carriers of the OFDM symbols, introducing an additional noise effect. Additionally, after passing through the channel, this non-linearity will affect the cyclic nature of the OFDM coding.

The power amplifier transient introduces a non-linearity by weighting at the transmitter all the samples of the block to be transmitted by a variable gain depending on the time index. This destroys the usual diagonal property of the transmission channel when inserting the cyclic prefix. The purpose of this further theoretical analysis is to analyse and quantify the resulting inter-carrier interference (ICI).

When adopting a digital modelling of the gain transients its effects can be described by the following equations:

$$x(nT) = (1 + ab^n)s(nT) \quad [3]$$

where x(t) is the time domain signal sent through the channel. By matching the above model parameters a and b to the curve of FIG. 3 it is found that a=0.0839269 and b=0.9997028.

To complete the notation, the classical operations for OFDM modulation of a vector S(k) (k being the symbol index, also referred to as block index) generating the time domain samples s(k) and cyclic prefix insertion transforming s(k) into $s^{cp}(k)$ are shown below and depicted in FIG. 8 (which will be explained in more detail later below):

$$s_n(k) = s((kN+n)T), \; 0 \le n < N \quad [4]$$

$$S(k) = (S_0(k), \ldots, S_{N-1}(k))^t$$

$$s(k) = (s_0(k), \ldots, s_{N-1}(k))^t = F_N^{-1} S(k)$$

$$s^{cp}(k) =$$

$$(s_{N-D}(k), s_{N-D+1}(k), \ldots, s_{N-1}(k), s_0(k), s_1(k), \ldots, s_{N-1}(k))^t$$

$$s(k) = \frac{1}{\sqrt{T}} F^{-1} S(k)$$

Here N denotes the FFT size and D the duration, in number of samples of the cyclic prefix, while T stands for the sampling rate. In the HIPERLAN/2 context 1/T=20 MHz, N=64 and D=16.

After some calculus, it can be shown, after guard interval stripping, that the filtering by the transmission channel $h=(h_0, \ldots, h_{d-1}, 0, \ldots, 0)^t$ can be modelled by the following matrix:

$$\begin{bmatrix} H_0 & 0 & 0 & H_1 \\ H_1 & H_0 & 0 & 0 \\ 0 & H_1 & H_0 & 0 \\ 0 & 0 & H_1 & H_0 \end{bmatrix} + ab^{k(N+D)} \begin{bmatrix} \beta H_0 \beta & 0 & 0 & H_1 \beta \\ \beta H_1 \beta & \beta^2 H_0 \beta & 0 & 0 \\ 0 & \beta^2 H_1 \beta & \beta^3 H_0 \beta & 0 \\ 0 & 0 & \beta^3 H_1 \beta & \beta^4 H_0 \beta \end{bmatrix} = \quad [5]$$

$$H_{circ} + H_{trans}(k)$$

where all the components of the matrices are blocks of size D×D:

$$H_0 = \begin{bmatrix} h_0 & 0 & \cdots & & \cdots & 0 \\ \vdots & \ddots & \ddots & & & \vdots \\ h_{N/4-1} & & \ddots & & & \vdots \\ \vdots & \ddots & & & \ddots & 0 \\ 0 & \cdots & h_{N/4-1} & \cdots & h_0 \end{bmatrix} \quad [6]$$

$$H_1 = \begin{bmatrix} 0 & \cdots & h_{N/4-1} & \cdots & h_1 \\ \vdots & \ddots & & & \vdots \\ \vdots & & \ddots & & h_{N/4-1} \\ \vdots & & & \ddots & \vdots \\ 0 & \cdots & \cdots & \cdots & 0 \end{bmatrix} \quad [7]$$

and $\beta = b^{N/4}$. The received time domain vector r(k) to be demodulated is thus expressed as (noiseless case):

$$r(k) = (H_{circ} + H_{trans}(k))s(k) \quad [8]$$

Notice that $H_{circ}$ is circular and corresponds to the classical circular convolution by the channel (yielding no ICI) whereas, $H_{trans}(k)$ models the distortion of the power amplifier transient and is the source of the ICI.

The Euclidean norm of $H_{trans}(k)$ provides a good indication of the level of the distortion at the receiver due to the transient when no compensation method is applied at the transmitter.

Figure 9:
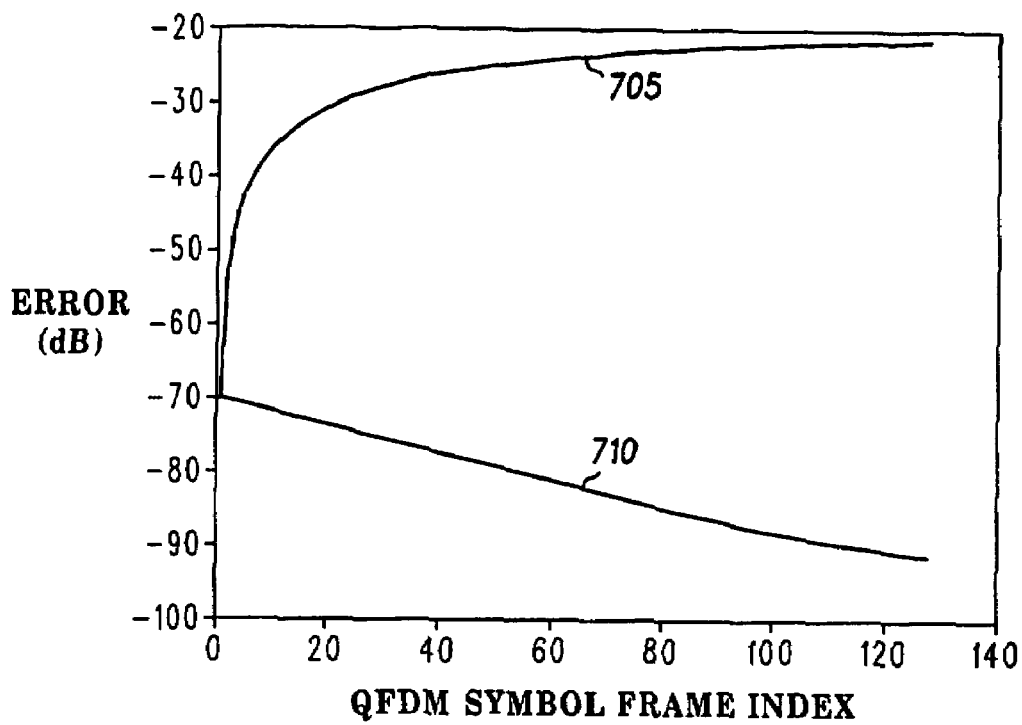
FIG. 9 is a schematic representation of noise introduced by a transient when no correction is applied and channel estimation is performed at the beginning of a frame.

The noise introduced by the transient when no correction is applied and channel estimation is performed at the beginning of the frame is depicted (reference numeral 705), over one channel realisation, as a function of the OFDM symbol in FIG. 9. FIG. 9 also shows a corrected characteristic 710 that will be described later below. The limiting value of the error is the cause of the error floors seen in FIGS. 6 and 7. It can be shown that the observed level of error corresponds well with the value of the error floor in the BER and PER.

Figure 10:
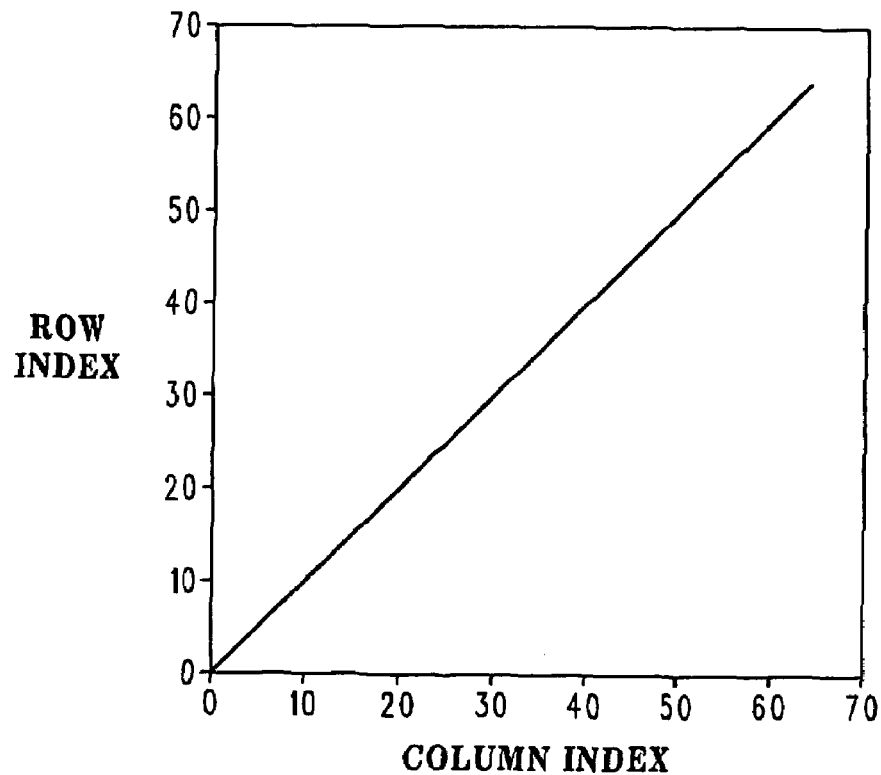
FIG. 10 shows a transient matrix coefficient in the frequency domain.

An important observation is that in practice in the frequency domain, the ICI is nearly non existent since $F_N H_{trans}(k) F_N^{-1}$ is quasi-diagonal as shown in FIG. 10, which shows the transient matrix coefficient in the frequency domain.

Moreover considering only the diagonal elements of $F_N H_{trans}(k) F_N^{-1}$ we find that they are all proportional to the respective channel coefficients in the frequency domain.

As mentioned earlier above, in overview, in this embodiment the respective power amplifiers 224 of the mobile terminals 4, 6 are switched off when not in use, and then switched on again when a signal transmission is to be made. This conserves power, but introduces a power amplifier transient. The access point 2 compensates for these power amplifier transients using a simple scalar constant gain transient correction, over a full OFDM symbol (or a plurality of OFDM symbols). The correction is updated on an OFDM symbol by symbol basis (or plurality of symbols by plurality of symbols basis).

The above analysis shows how the convenient use, for compensation, of the approximation of using a simple scalar constant gain transient correction over a full OFDM symbol, with the correction updated on a symbol by symbol basis, produces good results. Further details of this compensation process will now be described.

The approximation underlying the present compensation process in effect comprises assuming that $B \approx I_D$ (the identity matrix of size D), $\beta \approx 1$ and $H_{trans}(k) \approx ab^{k(N+D)} H_{circ}$. This yields the following gain coefficient (i.e. compensation coefficient) for cancelling the power amplifier transient: $\alpha(k) = 1 + ab^{k(N+D)}$.

Figure 11:
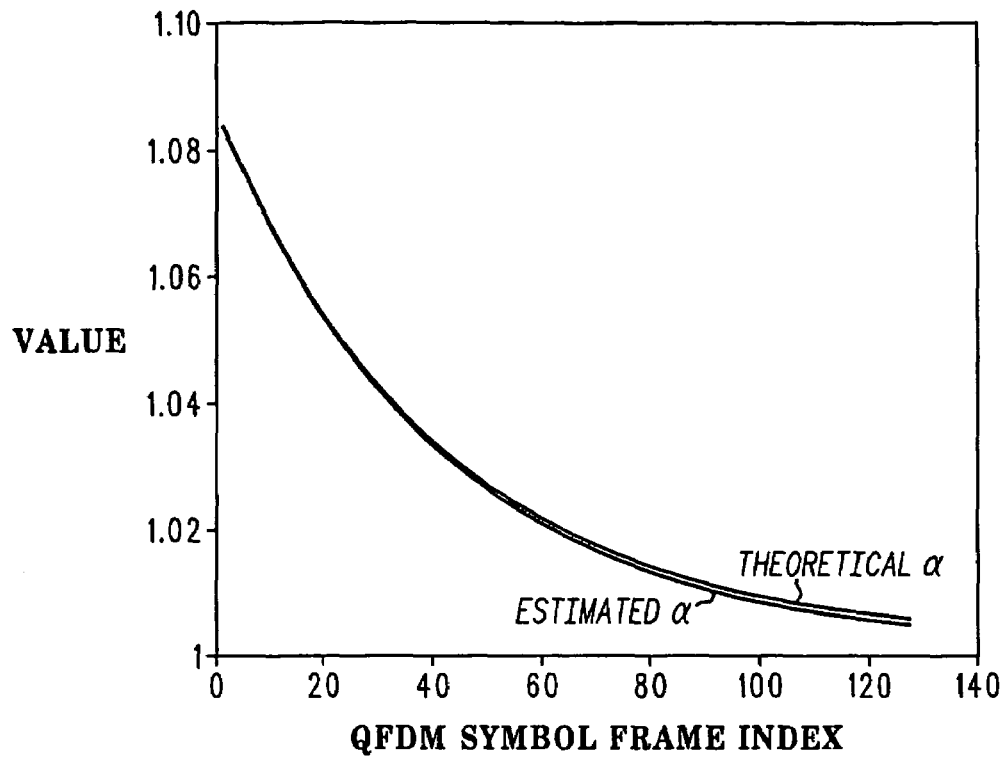
FIG. 11 shows theoretical values of the gain to apply to cancel power amplifier transient effects.
Figure 12:
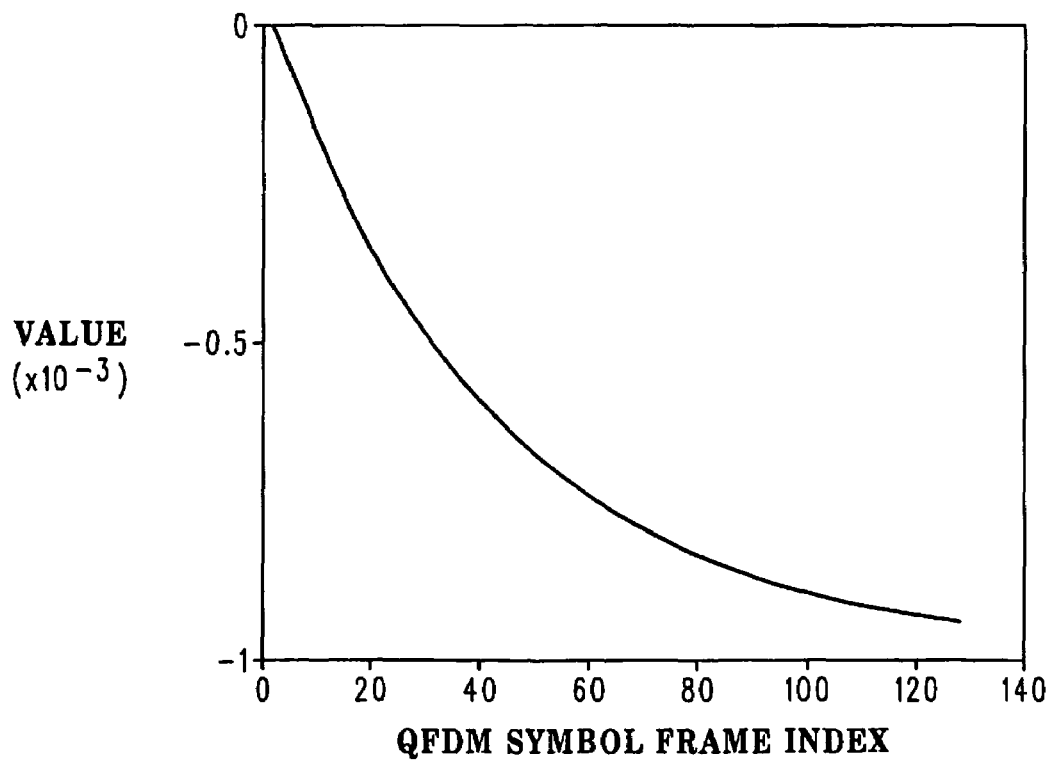
FIG. 12 shows a mean square error (MSE) on the gain value.

FIG. 11 shows the theoretical values of the gain to apply to cancel the power amplifier transient effects resulting from this approximation as a function of the OFDM symbol index in the frame. FIG. 12 shows the mean square error (MSE) on the gain value resulting from this approximation as a function of the OFDM symbol index in the frame.

The compensation scheme involves measuring digitally the power level of the pilot symbols (or carriers) of the OFDM signal. (The pilot symbols or carriers are used to help demodulation and so on, and are inserted at certain frequency positions in the signal.) This average power level is then used to compensate the OFDM signal before a decision (a decision being the determination of what point or value is meant to be provided by the points spread of a constellation). The compensation coefficients are updated on an OFDM symbol by symbol basis. (In other embodiments, the compensation coefficients may be updated after plural symbols.) An advantage of this scheme is micro-code and the correction itself involves only a single vector multiplication.

It is convenient at this stage to expound on what is meant here by the terminology "OFDM symbol". The following items are all equivalent and covered by the terminology "OFDM symbol", each applying in respective situations or according to the domain (e.g. frequency or time) in which the skilled person is considering the signal processing operations.

The term OFDM symbol can be used either for a frequency domain OFDM symbol which is the input vector of the inverse fast Fourier transform (IFFT) at the transmitter (transmitted frequency domain OFDM symbol) or the output of the FFT at the receiver (received frequency domain OFDM symbol) or a time domain OFDM symbol which is the signal at the output of the IFFT at the transmitter (transmitted time domain OFDM symbol) or the input of the fast Fourier transform (FFT) at the receiver (received time domain OFDM symbol).

The OFDM symbol duration is the time needed to transmit both the useful time domain samples and the cyclic extension associated to a given time or frequency domain OFDM symbol. Thus the term OFDM symbol also corresponds to S(k) and/or s(k) as present in equation 4, again depending on which domain the skilled person is considering.

The compensation scheme of this embodiment is formally described below by the following equations:

$$\hat{H}(0) = R(0) \otimes S*(0)$$

$$a(k) = \frac{\sum_{i \in Pil} R_i(k)\hat{H}_i^*(0)S_i^*(k)}{\sum_{i \in Pil} |\hat{H}_i(0)|^2}$$

$$\hat{S}(k) = \alpha(k)\hat{H}^*(0) \otimes R(k)$$

[9]

where x̂ denotes the Schur product of 2 vectors (component wise product) and * the conjugate operator. The first equation represents the initial channel estimation performed on symbol 0 of the frame. All these operations are represented in FIG. 8.

In the correction scheme it may be noted that it basically amounts to changing the equalisation taps in the frequency domain, that are normally fixed, to a vector that needs to be weighted by the variable gain α(k), updated as each new OFDM block is received. The Viterbi metric used in the decoder is weighted accordingly.

Thus this scheme is preferred to a simple gain multiplication by 1/α(k) of all the carriers in the receiver. However, it is to be appreciated that in an alternative embodiment simple gain multiplication by 1/α(k) of all the carriers in the receiver is implemented, and this still represents a significant improvement over the prior art.

Figure 8:
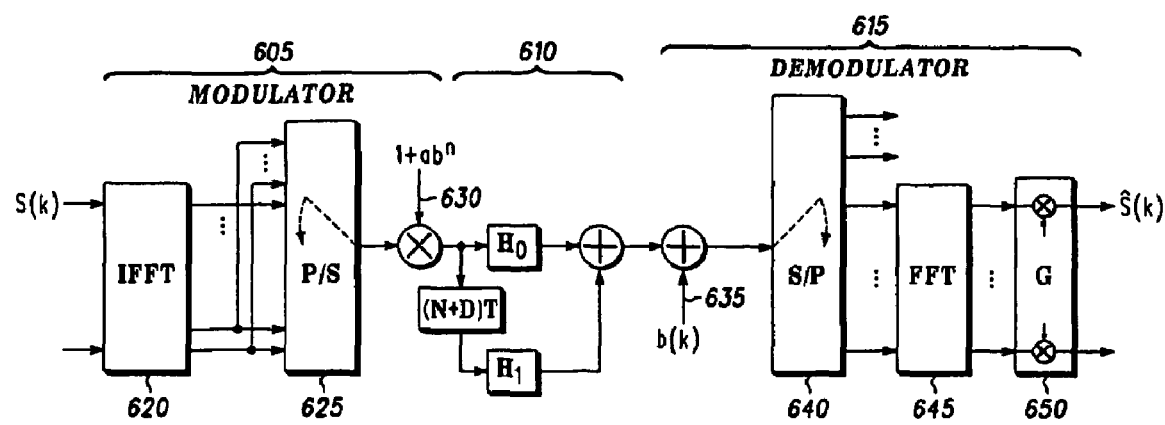
FIG. 8 shows different modules or elements of a process of signal modulation, transmission, reception and demodulation.

FIG. 8 will now be explained in more detail. FIG. 8 shows different modules or elements of the process of signal modulation, transmission, reception and demodulation of this embodiment. In addition to the aspects discussed already above with respect to equations 4 to 8, FIG. 8 also shows the following The modules or elements are divided between the transmitter (i.e. modulator) 605, a representation 610 of the multi-path propagation of the signals in the environment, and the receiver (i.e. demodulator) 615.

The transmitter 605 comprises a modulation module 620 that performs an IFFT on the vector S(k) to generate the time domain samples s(k), and a parallel to serial converter 625. Also represented as part of the transmitter is an element 630 which multiplies the serial samples by 1+ab$^n$ and which is represented as forming the power amplifier transient.

The representation 610 of the multi-path propagation of the signals in the environment is a schematic representation of the effect of equations 5 to 8.

The receiver 615 comprises an element 635 representing that the thermal noise of the system in effect adds b(k) to the received signal. The receiver 615 further comprises a serial to parallel converter 640, a demodulation module 645 that performs an FFT, and an equaliser 650.

The above described compensation scheme is effectively implemented in or by the equaliser 650, by virtue of the incorporation of the scalar constant gain coefficient α(k) (as per equation 9 above). In this embodiment the receiver 615 is implemented as part of the controller 214 described above with reference to FIG. 2.

Returning to FIG. 9, this further shows (reference numeral 710) the theoretical efficiency of the power amplifier transient compensation scheme in the noiseless case under perfect synchronisation assumption and justifies its use in the practical case. It can be noticed that power amplifier transient rejection is almost complete. It should be noted that this scheme assumes a perfect synchronisation and therefore only the gain of the transient has been taken into account since normally the phase component should be cancelled by the phase tracking algorithms of the synchronisation algorithms.

Figure 13:
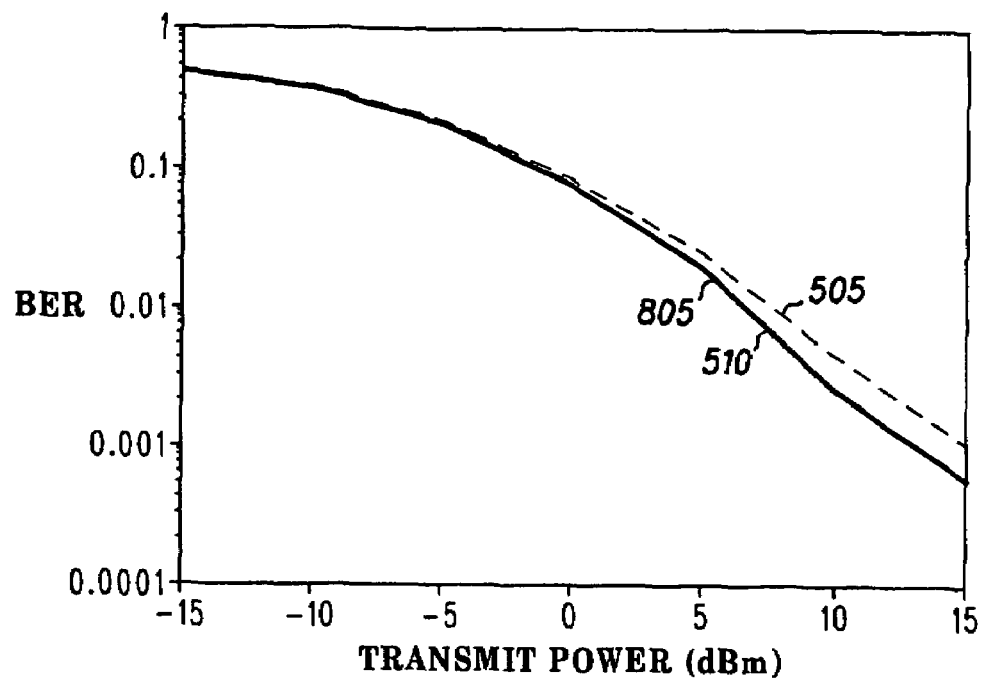
FIG. 13 shows bit error rates for different conditions including use of a compensation scheme of an embodiment of the invention.

We have implemented this scheme in a HIPERLAN/2 simulator and rerun the simulations shown in FIG. 6 and FIG. 7. FIG. 13 shows the result, of using the compensation scheme, on the BER of a 64 QAM signal on a BRAN-A channel, with an ITU-P1238 propagation model and 5 m spacing between receiver and transmitter. More particularly, FIG. 13 shows the same bit error rate (BER) with transient 505 (and no compensation) as was shown in FIG. 5a, the same bit error rate without transient 510 as was shown in FIG. 6, and also the bit error rate with transient and compensation 805. It will be seen that, to the resolution of the graph, the bit error rate with transient and compensation 805 is the same as the bit error rate without transient 510, showing the effectiveness of the compensation scheme, i.e. improvement in the system performance.

Figure 14:
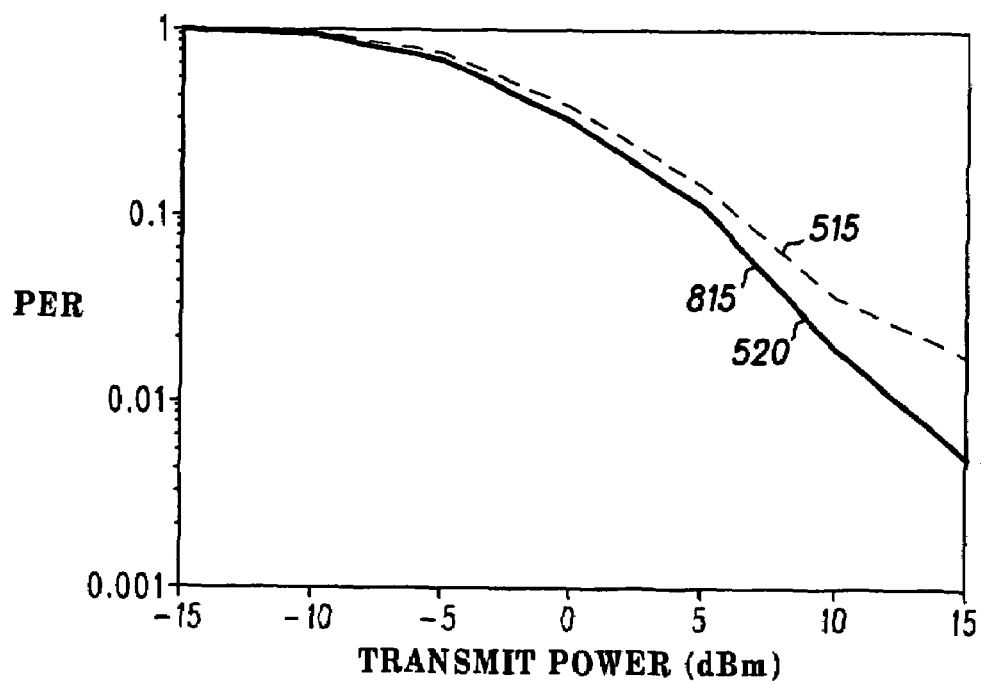
FIG. 14 shows packet error rates for different conditions including use of a compensation scheme of an embodiment of the invention.

Likewise, FIG. 14 shows the result, of using the compensation scheme, on the PER of a 64 QAM signal on a BRAN-A channel, with an ITU-P1238 propagation model and 5 m spacing between receiver and transmitter. More particularly, FIG. 14 shows the same packet error rate (PER) with transient 515 (and no compensation) as was shown in FIG. 7, the same packet error rate without transient 520 as was shown in FIG. 7, and also the packet error rate with transient and compensation 815. It will be seen that, to the resolution of the graph, the packet error rate with transient and compensation 815 is the same as the packet error rate without transient 520, showing the effectiveness of the compensation scheme, i.e. improvement in the system performance.

Hence, as the earlier theoretical analysis indicates, the simple correction scheme that is proposed in this invention is potentially able to recover all or substantially all system performance due to the power amplifier transient.

In further embodiments, improvements can be derived by identifying directly from α(k) the model's parameters a and b and averaging these estimates over time on a block basis.

It should be noted that other gain transient effects, such as a Doppler in the channel, could also be partially corrected by this tracking scheme. As such, it is noted that in other embodiments the present invention is applied to compensating or partially compensating (or correcting or partially correcting) other types of gain transients.

The present invention finds particular application in wireless communication systems such as HIPERLAN/2 systems. However, the inventive concepts contained herein are equally applicable to alternative wireless communications systems. Whilst the specific, and preferred, implementations of the present invention are described above, it is clear that variations and modifications of such inventive concepts could be readily applied by one skilled in the art.

It will be understood that the power amplifier transient compensation process and apparatus described above tends to provide, inter alia, the possibility of allowing a power amplifier transient, hence allowing the power amplifier to be switched on and off so saving power, with a simple to implement but effective compensation process at the receiver side. No feedback of any RF component of the transmission is required.

The invention claimed is:

1. A method of compensating a power amplifier transient of a received orthogonal frequency division multiplex, OFDM, signal, the method comprising:

measuring a power level of pilot symbols or carrier levels of the received OFDM signal to determine a scalar gain coefficient dependent upon the power amplifier transient; and compensating the power amplifier transient using the scalar gain coefficient, wherein the scalar gain coefficient is determined as respective constant values for respective OFDM symbols or respective pluralities of OFDM symbols of the OFDM signal, and variable over different OFDM symbols or different pluralities of OFDM symbols of the OFDM signal.

2. A method according to claim 1, wherein the step of compensating the power amplifier transient is performed on a plurality of symbols by plurality of symbols basis or on a symbol-by-symbol basis.

3. An orthogonal frequency division multiplex, OFDM, communication method, comprising:
  transmitting an OFDM signal comprising a power amplifier transient;
  receiving the OFDM signal comprising the power amplifier transient; and
  compensating the power amplifier transient using a method according to claim 1.

4. A method according to claim 3, wherein the method is performed in a communication system in which an allowable degree of received signal degradation is specified, and, when the OFDM signal is received, the power amplifier transient would be accommodated to the specified allowable degree of signal degradation, if the compensation step were not performed.

5. A communication system adapted to perform the method of claim 3.

6. A communication system according to claim 5 conforming to the HIPERLAN/2 system specification.

7. A method according to claim 1, adapted for use in a HIPERLAN/2 communication system.

8. A storage medium storing processor-implementable instructions for controlling a processor to carry out the method of claim 1.

9. A communication unit adapted to perform the method of claim 1.

10. A communication unit according to claim 9, in the form of an access point or a mobile terminal for a HIPERLAN/2 system.

11. A method of compensating a power amplifier transient of a received orthogonal frequency division multiplex, OFDM, signal, the method comprising:
  measuring a power level of pilot symbols or carrier levels of the received OFDM signal to determine a scalar gain coefficient dependent upon the power amplifier transient; and
  compensating the power amplifier transient using the scalar gain coefficient, wherein the scalar gain coefficient is determined by averaging over said pilot symbols or said carrier levels.

12. A method of compensating a power amplifier transient of a received orthogonal frequency division multiplex, OFDM, signal, the method comprising:
  measuring a power level of pilot symbols or carriers of the received OFDM signal to determine a scalar gain coefficient dependent upon the power amplifier transient; and
  compensating the power amplifier transient by equalizing the received OFDM signal using equalisation taps multiplied by the scalar gain coefficient.

13. A method of compensating a power amplifier transient of a received orthogonal frequency division multiplex, OFDM, signal, the method comprising:
  measuring a power level of pilot symbols or carriers of the received OFDM signal to determine a scalar gain coefficient dependent upon the power amplifier transient; and
  compensating the power amplifier transient by multiplying a channel estimate by an inverse of a determined scalar gain coefficient.

14. A method of compensating a power amplifier transient of a received orthogonal frequency division multiplex, OFDM, signal, the method comprising:
  measuring a power level of pilot symbols or carriers of the received OFDM signal to determine a scalar gain coefficient dependent upon the power amplifier transient; and
  compensating the power amplifier transient using a scalar gain coefficient to weight metrics used by a decoder.

* * * * *